Nov. 16, 1965  W. E. KNIGHT ETAL  3,217,689
PROPELLANT LEAK INDICATOR
Filed Dec. 21, 1964
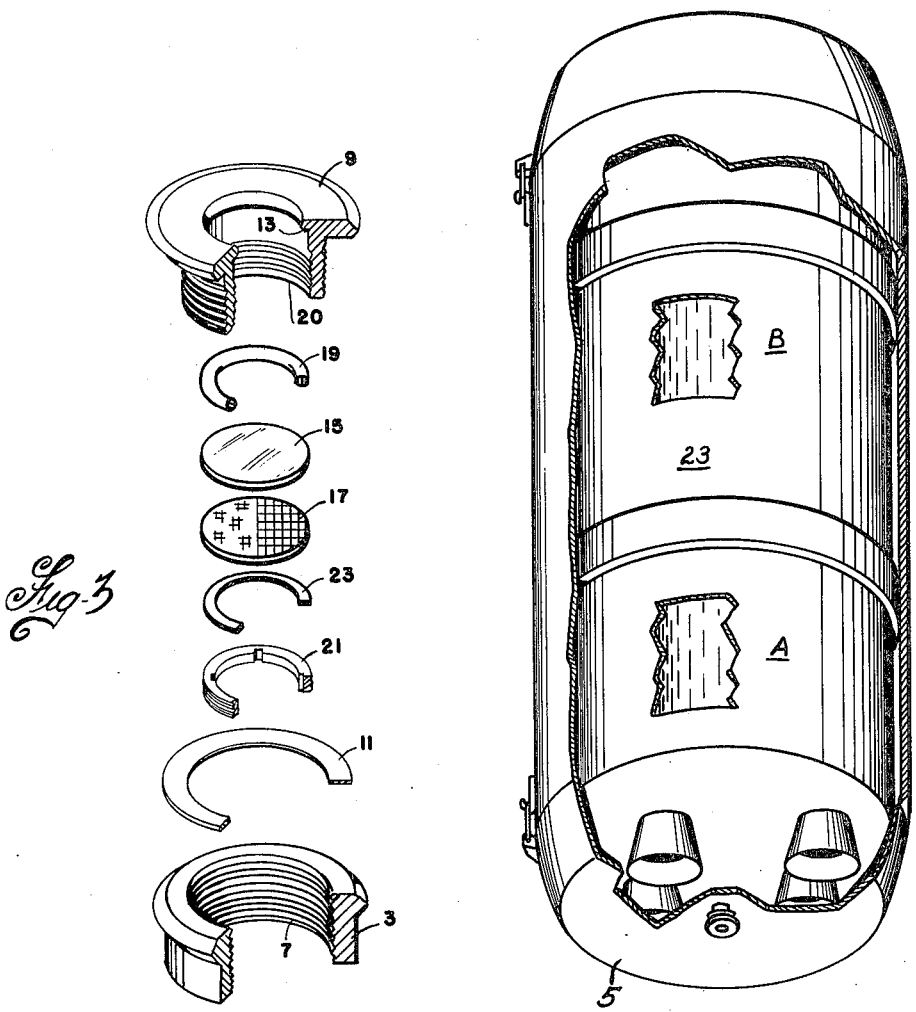
INVENTOR.
WALTER E. KNIGHT
JOSEPH E. CARROLL
BY 3,217,689
PROPELLANT LEAK INDICATOR
Walter E. Knight, Greenfield Heights, Woodbury, N.J., and Joseph E. Carroll, Springfield, Pa., assignors to the United States of America as represented by the Secretary of the Navy
Filed Dec. 21, 1964, Ser. No. 420,225
1 Claim. (Cl. 116—114)
(Granted under Title 35, U.S. Code (1952), sec. 266)

The invention described herein may be manufactured and used by or for the Government of the United States of America for governmental purposes without the payment of any royalties thereon or therefor.

This is a continuation-in-part of our copending application Serial Number 320,231, filed Oct. 30, 1963.

This invention relates to an apparatus which provides practical means for detecting leaks in systems containing volatile liquids such as ammonia, rocket fuels, liquid oxidizers, etc. More specifically, the invention pertains to a device capable of being installed in the end of a storage cylinder, in which a liquid propulsion rocket motor assembly is housed for detection of a leak in the liquid propulsion system from outside the storage cylinder.

A liquid propulsion system for a rocket motor consists of a fuel component and an oxidizing component. The two liquids are stored in separate sections within the motor assembly. These sections are separated by suitable means until the two liquids are to be brought into contact with one another to produce a chemical reaction which energizes the motor.

Prior to the assembling of a missile, the rocket motor and the component fuel and oxidizing liquid containers are stored in cylinders for transportation to the sites where the missiles are to be assembled. Because of the relatively high pressures at which the fuel and oxidizing agent are maintained and due to the corrosive nature of the chemical products, leakage of the liquid components through minute cracks in the motor encasement frequently occur, thereby causing the storage cylinder to fill with the vapors. Previously, no suitable apparatus has been available for detecting the presence of a leak in the rocket motor assembly without opening the storage cylinder. Moreover, it was impossible to determine whether one or both of the liquids were leaking. Both the fuel and oxidizer components are very toxic; therefore, any personnel opening a container to test for a leak in the rocket motor would be exposed to possible harm.

It is therefore an object of the present invention to provide novel and useful indicating means which make it possible to determine if a leak of either the oxidizer or the mixed amine fuel has taken place inside the cylinder housing of the rocket motor assembly.

Another object herein lies in provision of an indicating means of the character described which is quickly and easily installed or replaced.

Yet another object herein lies in the provision of an indicating means of the character described which provides improved viewing of the indicating elements thereof.

A still further object herein lies in the provision of an indicating means for detecting leaks in liquid propellant rocket motors stored in cylinders which is of a simple and economical construction.

Other objects and many of the attendant advantages of this invention will be readily appreciated as the same becomes better understood by reference to the following detailed description which is considered in connection with the accompanying drawing wherein:

FIG. 1 is a partially cut-away perspective view of our improved indicator in its preferred embodiment.

FIG. 2 is a cross sectional view of the improved indicator assembly of the invention shown in FIG. 1; and FIG. 3 is an exploded perspective view of the invention shown in FIG. 1 with some parts thereof partially cut away.

Referring now to the drawing wherein like reference characters denote corresponding parts, the improved indicator assembly of the present invention includes the flanged tubular fitting 3 which is welded, or secured in an aperture in the wall of the rocket motor assembly housing 5 in any suitable fluid tight manner. The fitting 3 is internally threaded at 7 to receive the complementary external threads of a second flanged tubular fitting 9. The flat annular rubber gasket or the like 11 which is preferably disposed between the upper surface of the flanged portion of fitting 3 and the lower surface of the flanged portion of fitting 9 provides a fluid tight seal when the fittings 3 and 9 are assembled. The internal surface of the fitting 9 is provided with an annular seat 13 in which the transparent glass window 15 and the indicator sheet or pad 17 are positioned. The compressible rubber O ring or the like 19 is disposed between the glass window 15 and the seat 13 in fitting 9 to provide an effective fluid tight seal. The internal surface of tubular fitting 9 is also threaded at 20 to receive the complementary external threads of the annular lockscrew 21 which is adapted to removably secure the glass window 15 and the indicator pad 17 in position in seat 13 of fitting 9. The annular polytetrafluoroethylene washer 23 is also preferably provided as shown between the indicator pad 17 and the lockscrew 21.

The indicating means or pad 17 comprises a sheet of any absorbing medium such as filter paper, blotting paper, fritted glass or the like which has a porous or absorbing surface. This sheet may be of any convenient size and shape. As illustrated in the drawings, the sheet 17 is a circular disc of white filter paper one-half of which is impregnated with N-phenylanthranilic acid and the other half of which is impregnated with mercurous chloride. The mercurous chloride is nearly insoluble in both water and organic solvents. Because of this behavior, the impregnation of mercurous chloride was done in the following manner:

One gram of cellulose gum was dissolved in one hundred milliliters of water. Fifteen grams of mercurous chloride was added and thoroughly mixed. Two drops of this mixture were added to one-half of the sheet 17 and sheet 17 was then dried in a desiccator.

The N-phenylanthranilic acid was impregnated on the other half of the sheet in the following manner:

The N-phenylanthranilic acid was dissolved in methyl alcohol, the end of sheet 17 not covered with the mercurous chloride is dipped into the alcoholic solution and then dried in a desiccator. The unique feature of this indicating means is that its ability to simultaneously detect the presence of a liquid oxidizer and a liquid fuel. Neither of the indicating substances incorporated on sheet 17 interferes with the other one in undergoing their respective color transformations in response to being contacted by either of the above substances. The mercurous chloride undergoes a white to black color change when contacted by any of the following liquid fuels:

METHYL HYDRAZINE FUEL-1

Composition: Percent by weight
    Monomethyl hydrazine _____ 43.3
    Hydrazine nitrate _____ 31.4
    Hydrazine _____ 23.3

METHYL HYDRAZINE FUEL–2

| Composition: | Percent by weight |
|---|---|
| Lithium borohydride | 13.0 |
| Ammonia | 10.0 |
| Hydrazine | 77.0 |

METHYL HYDRAZINE FUEL–3

| Composition: | Percent by weight |
|---|---|
| Unsymmetrical dimethyl hydrazine | 37.2 |
| Hydrazine nitrate | 39.3 |
| Hydrazine | 23.5 |

METHYL AMINE FUEL–1

| Composition: | Percent by weight |
|---|---|
| Diethylenetriamine | 50.0 |
| Unsymmetrical dimethyl hydrazine | 40.0 |
| Acetonitrile | 10.0 |

METHYL AMINE FUELS–2, 3 AND 4

| Composition: | Percent by weight |
|---|---|
| Diethylenetriamine | 40–80 |
| Unsymmetrical dimethyl hydrazine | 60–20 |

On being exposed to fuming nitric acid for 72 hours, the mercurous chloride portion of sheet 17 remained white while the N-phenylanthranilic acid portion of sheet 17 turned bright yellow after 2 minutes of such exposure. On exposure to mixed amine and hydrazine fuels, the mercurous chloride portion of sheet 17 turned black after 5 minutes of exposed time had elapsed while the N-phenylanthranilic acid portion of sheet 17 remained white.

The resulting indicator sheet of the invention is stable and may be kept for long periods without deterioration.

This indicator may be used in any number of ways, however, the preferred manner of use is to place it in seat 13 in outer fitting 9 and to secure it and the transparent window 15 therein by means of the lockscrew 21. The fitting 9 is then secured in the fitting 3 in container 5. Tank 23 within container 5 contains a liquid oxidizing component such as red fuming nitric acid in Section A and a fuel component comprising one of the fuels enumerated hereinabove in Section B. If a leak develops in either or both of these compartments, its source can be readily determined by observing a color change in either the mercurous chloride or the N-phenylanthranilic acid impregnated on sheet 17 in fitting 9.

Obviously, many modifications and variations of the present invention are possible in the light of the above teachings. It is therefore to be understood that within the scope of the appended claim, this invention may be practiced otherwise than as specifically described herein.

We claim:

Apparatus for detecting leakage of a fuel and an oxidizing agent from their separate sealed compartments within a rocket motor assembly when said assembly is stored in a fluid tight container, said apparatus comprising:

(a) a first flanged tubular fitting which is secured in an aperture in a wall of the container;
(b) a second flanged tubular fitting which is removably secured within the first fitting, the upper surface of the second fitting having an inwardly extending annular lip that provides an internal annular seat;
(c) a circular transparent glass window;
(d) a circular absorbent pad, one half of the pad being impregnated with N-phenylanthranilic acid and the other half of the pad being impregnated with mercurous chloride;
(e) and means for securing the window in the seat in a fluid tight manner and the pad against the internal surface of the window.

No references cited.

LOUIS J. CAPOZI, *Primary Examiner.*